United States Patent
Stewart

(10) Patent No.: US 10,715,861 B2
(45) Date of Patent: Jul. 14, 2020

(54) MOBILE ATSC 3.0 RECEIVER AS REMOTE ANTENNA

(71) Applicant: INTERDIGITAL MADISON PATENT HOLDINGS, SAS, Paris (FR)

(72) Inventor: John Sidney Stewart, Indianapolis, IN (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/553,846

(22) PCT Filed: Mar. 14, 2016

(86) PCT No.: PCT/US2016/022248
§ 371 (c)(1),
(2) Date: Aug. 25, 2017

(87) PCT Pub. No.: WO2016/149163
PCT Pub. Date: Sep. 22, 2016

(65) Prior Publication Data
US 2018/0077450 A1    Mar. 15, 2018

Related U.S. Application Data

(60) Provisional application No. 62/134,148, filed on Mar. 17, 2015.

(51) Int. Cl.
*H04N 21/4363* (2011.01)
*H04N 21/414* (2011.01)
(Continued)

(52) U.S. Cl.
CPC . *H04N 21/43637* (2013.01); *H04N 21/41407* (2013.01); *H04N 21/42607* (2013.01); *H04W 88/04* (2013.01)

(58) Field of Classification Search
CPC ....... H04N 21/43637; H04N 21/41407; H04N 21/42607; H04W 88/04
See application file for complete search history.

(56) References Cited

U.S. PATENT DOCUMENTS 6,097,441 A * 8/2000 Allport ............ H04N 21/43632
348/120
6,577,353 B1 * 6/2003 Welles, II ............ H04B 7/0871
348/705
(Continued)

FOREIGN PATENT DOCUMENTS

AU      2009255434      12/2009
CN      102917196 A     2/2013
(Continued)

OTHER PUBLICATIONS wikipedia.org, "Radio Telescope", Sep. 10, 2014.
(Continued)

*Primary Examiner* — Alexander Q Huerta
(74) *Attorney, Agent, or Firm* — Volpe and Koenig, P.C.

(57) ABSTRACT

A method and apparatus for improving signal quality in a relatively fixed ATSC 3.0 device are described including accepting a channel selection, establishing communication with all ATSC 3.0 devices in a premises, polling each portable ATSC 3.0 device to obtain signal quality information, selecting one or more of the portable ATSC 3.0 devices to receive a signal, receiving IP packetized data related to a program on the selected channel from the one or more selected portable ATSC 3.0 devices to improve signal quality at the relatively fixed ATSC 3.0 device and combining the received IP packetized data received from the one or more selected portable ATSC 3.0 devices with a signal of the relatively fixed ATSC 3.0 device to form a combined signal for rendering a program on the selected channel.

12 Claims, 5 Drawing Sheets

(51) Int. Cl.
  *H04W 88/04* (2009.01)
  *H04N 21/426* (2011.01)

(56) References Cited

U.S. PATENT DOCUMENTS

| | | | |
|---|---|---|---|
| 10,341,722 B2* | 7/2019 | Petruzzelli | H04N 21/4382 |
| 2003/0060218 A1* | 3/2003 | Billerbeck | G06F 3/0231 |
| | | | 455/501 |
| 2003/0093813 A1* | 5/2003 | Shintani | H04N 5/4403 |
| | | | 725/133 |
| 2004/0163130 A1* | 8/2004 | Gray | H04N 7/15 |
| | | | 725/132 |
| 2004/0236850 A1* | 11/2004 | Krumm | H04L 29/06 |
| | | | 709/224 |
| 2004/0252243 A1 | 12/2004 | Stewart | |
| 2005/0102698 A1* | 5/2005 | Bumgardner | H04N 5/765 |
| | | | 725/80 |
| 2006/0033843 A1* | 2/2006 | Klopfenstein | H04N 5/50 |
| | | | 348/570 |
| 2008/0238808 A1* | 10/2008 | Arita | H01Q 3/24 |
| | | | 343/893 |
| 2009/0031386 A1* | 1/2009 | Chan | H04N 7/161 |
| | | | 725/131 |
| 2009/0100467 A1* | 4/2009 | Cake | H04N 5/44543 |
| | | | 725/40 |
| 2009/0102979 A1 | 4/2009 | Matsuoka et al. | |
| 2009/0125971 A1* | 5/2009 | Belz | H04N 7/163 |
| | | | 725/153 |
| 2009/0303394 A1* | 12/2009 | Poo | H04N 5/4401 |
| | | | 348/731 |
| 2010/0106797 A1* | 4/2010 | Nagaraja | H04B 7/026 |
| | | | 709/217 |
| 2010/0169935 A1* | 7/2010 | Abbruzzese | G11B 5/584 |
| | | | 725/62 |
| 2010/0251292 A1* | 9/2010 | Srinivasan | H04H 20/57 |
| | | | 725/37 |
| 2011/0043708 A1* | 2/2011 | Clardy | H04N 5/4401 |
| | | | 348/731 |
| 2011/0050908 A1* | 3/2011 | Nam | H04L 1/22 |
| | | | 348/192 |
| 2011/0289525 A1* | 11/2011 | Dureau | H04H 60/72 |
| | | | 725/14 |
| 2012/0017250 A1* | 1/2012 | Tirasirikul | H04N 7/18 |
| | | | 725/85 |
| 2013/0097638 A1* | 4/2013 | Tanner | H04H 20/24 |
| | | | 725/39 |
| 2013/0183895 A1* | 7/2013 | Gore | H04B 7/0404 |
| | | | 455/7 |
| 2013/0205351 A1* | 8/2013 | Kortum | H04N 5/63 |
| | | | 725/80 |
| 2014/0198258 A1* | 7/2014 | Ling | H04N 21/4263 |
| | | | 348/726 |
| 2014/0282780 A1* | 9/2014 | Craib | H04N 21/4126 |
| | | | 725/110 |
| 2014/0368743 A1* | 12/2014 | Yang | H01Q 21/28 |
| | | | 348/731 |
| 2015/0007236 A1* | 1/2015 | Dureau | H04N 21/43615 |
| | | | 725/88 |
| 2015/0089536 A1* | 3/2015 | Byerley | H04N 21/25816 |
| | | | 725/28 |
| 2015/0100983 A1* | 4/2015 | Pan | H04N 21/4126 |
| | | | 725/39 |

FOREIGN PATENT DOCUMENTS

| | | |
|---|---|---|
| CN | 103607659 A | 2/2014 |
| EP | 2040492 | 3/2009 |
| JP | 2004165940 A | 6/2004 |
| JP | 2005507617 A | 3/2005 |
| JP | 2006211423 A | 8/2006 |
| JP | 201011123 | 1/2010 |
| JP | 2010021873 A | 1/2010 |
| JP | 5389933 | 10/2013 |
| KR | 20110024283 | 3/2011 |
| WO | WO2013181191 | 12/2013 |

OTHER PUBLICATIONS

Zoellner, et al; TM-CSU0049: SMR: Dofs & Use Cases; Jul. 1, 2013; DVB, Digital Video Broadcasting, Geneva, Switzerland; p. 5, paragraphs 31-36.

ISR for PCT/US2016/022248 dated May 25, 2016.

* cited by examiner

MOBILE ATSC 3.0 RECEIVER AS REMOTE ANTENNA

This application claims the benefit, under 35 U.S.C. § 365 of International Application PCT/US2016/022248, filed 14 Mar. 2016, which was published in accordance with PCT Article 21(2) on 22 Sep. 2016 in English and which claims the benefit of U.S. provisional patent application No. 62/134,148, filed 17 Mar. 2015.

FIELD OF THE INVENTION

The present invention relates to a method to use unused ATSC 3.0 portable receivers as additional remote receivers for one or more TVs (relatively fixed ATSC 3.0 receivers) in the premises.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system. TVs (relatively fixed ATSC 3.0 receivers) and portable ATSC 3.0 devices have a WiFi communication capability as well as the ability to receive broadcast content. That is both TVs (relatively fixed ATSC 3.0 receivers) and portable ATSC 3.0 devices may receive content by receiving broadcast signals or multicast signals (over the WiFi connection) or unicast signals (also over the WiFi connection).

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

SUMMARY OF THE INVENTION

The next generation TV standard is currently being developed as ATSC 3.0. One of the goals of this standard is to not only provide services to relatively fixed devices such as televisions, but to also provide services to mobile devices such as cell phones and tablet devices, laptop and notebook computers to name a few. One difference between a TV and a portable device is the rate at which the devices are replaced. Typically, a TV due to its size and installation requirements may be changed out every 10-15 years. On the other hand, it is common for portable devices (e.g., cell phones) to be changed every 1-2 years. If these portable devices have integrated ATSC 3.0 receivers, it may become common for people to have several "old" portable devices that they no longer use. Since these receivers will also generally have WiFi capability, these unused portable ATSC 3.0 receivers can be used as remote receivers to improve the reception for one or more TVs (relatively fixed ATSC 3.0 receivers) within the house (premises).

A method and apparatus for improving signal quality in a relatively fixed ATSC 3.0 device are described including accepting a channel selection, establishing communication with all ATSC 3.0 devices in a premises, polling each portable ATSC 3.0 device to obtain signal quality information, selecting one or more of the portable ATSC 3.0 devices to receive the signal, receiving IP packetized data related to a program on the selected channel from the one or more selected portable ATSC 3.0 device to improve signal quality at the relatively fixed ATSC 3.0 device and combining the received IP packetized data received from the one or more selected portable ATSC 3.0 devices with the signal of the relatively fixed ATSC 3.0 device to form a combined signal for rendering a program on the selected channel. Also described are a method and apparatus for using a portable ATSC 3.0 device to improve signal quality for a relatively fixed ATSC 3.0 device including receiving a request to establish communications with the relatively fixed ATSC 3.0 device, establishing communications with the relatively fixed ATSC 3.0 device, receiving a request, from the relatively fixed ATSC 3.0 device, to measure signal quality of a channel, measuring the signal quality of the channel, transmitting the measured signal quality to the relatively fixed ATSC 3.0 device, receiving a request, from the relatively fixed ATSC 3.0 device, to transmit IP packetized data related to a program on the channel and transmitting the requested IP packetized data related to the program on the channel to the relatively fixed ATSC 3.0 device.

BRIEF DESCRIPTION OF THE DRAWINGS

The present invention is best understood from the following detailed description when read in conjunction with the accompanying drawings. The drawings include the following figures briefly described below.

Figure 1:
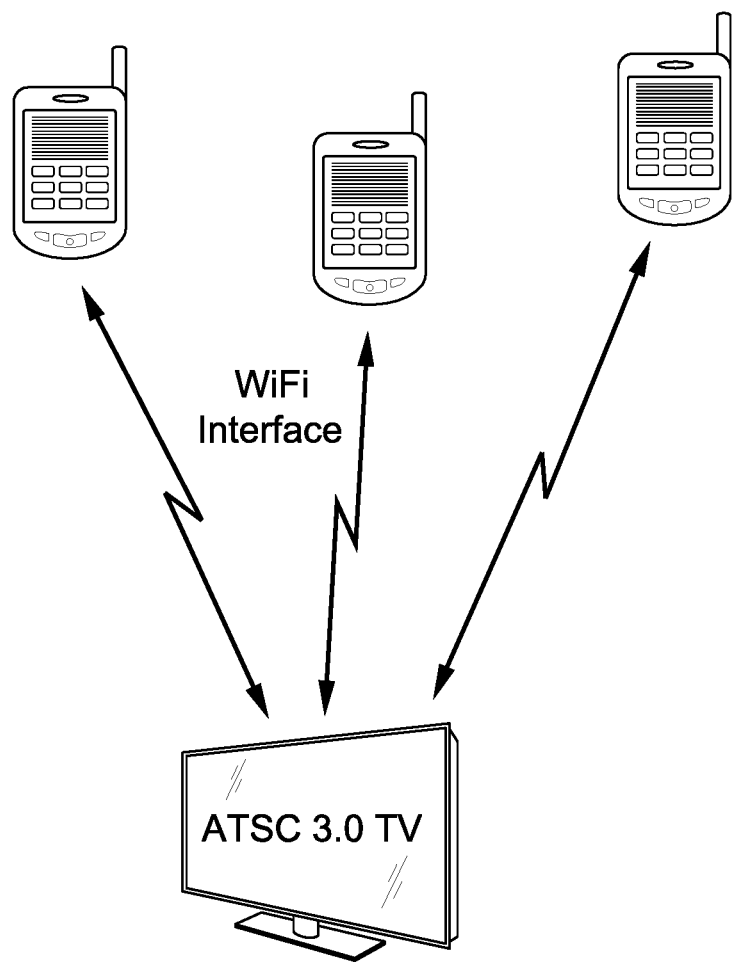
FIG. 1 is a schematic overview diagram of the disclosed concept.

It should be understood that the drawing(s) are for purposes of illustrating the concepts of the disclosure and is not necessarily the only possible configuration for illustrating the disclosure.

DETAILED DESCRIPTION OF THE PREFERRED EMBODIMENTS

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In particular, the ATSC 3.0 standard is directed to both portable devices (cell phones, iPhones, iPads, iPods and tablets) as well as relatively fixed devices (Home TVs). In addition, the ATSC 3.0 standard will mandate that the devices have network connectivity. This will set up a new environment in which there will be multiple ATSC 3.0 devices (both portable and relatively fixed) in the home that can communicate with each other. This may result in a situation where there may be several old unused ATSC 3.0 portable devices that are no longer being used for their original main function (e.g., cell phones) as they have been overtaken by newer models. These portable ATSC 3.0 devices (receivers) could be used to enhance the reception of the fixed device (relatively fixed ATSC 3.0 receiver) by placing them in the house at different locations and have them receive ATSC 3.0 signals. The ATSC 3.0 standard requires that the program data be packetized as IP packets. Therefore, once received by a particular ATSC 3.0 device, the data (content) can be sent over the home network to other ATSC 3.0 devices. The portable device could then communicate the received program to the relatively fixed ATSC 3.0 receiver via Wi-Fi or fixed Ethernet network connection.

Using older portable unused ATSC 3.0 capable devices as extra receivers for the TVs (relatively fixed ATSC 3.0 receivers) within the home will improve reception. The older unused portable ATSC 3.0 receivers will also have WiFi capability, so the portable ATSC 3.0 devices could be placed at various locations around the home (e.g., attic, close to a window, etc.). The older unused portable ATSC 3.0 receivers could then communicate via WiFi to the TVs (relatively fixed ATSC 3.0 receivers) to provide IP packetized data related to a desired TV program (content). A TV (relatively fixed ATSC 3.0 receiver) would communicate with one or more older unused ATSC 3.0 portable devices and choose the device that has the best signal for the particular channel in which the user is interested. The TV (relatively fixed ATSC 3.0 receiver) could receive data for a single channel from multiple portable receivers and combine them to produce a higher quality signal. In the case of multiple TVs (relatively fixed ATSC 3.0 receivers) in the home, a TV (relatively fixed ATSC 3.0 receiver) would need to coordinate with other TVs (relatively fixed ATSC 3.0 receivers) to get the best service (signal). This could require that a TV (relatively fixed ATSC 3.0 receiver) currently utilizing a portable device to switch off to another portable device if this optimized the viewing experience over multiple TVs (relatively fixed ATSC 3.0 receivers).

That is, the present invention is directed to several scenarios and thus, has several embodiments. In one scenario, there is a system where the TV (relatively fixed ATSC 3.0 receivers) communicates with the various portable ATSC 3.0 devices and selects the portable ATSC 3.0 device having the best signal for the particular channel the user of the TV (relatively fixed ATSC 3.0 receiver) is trying to receive. One portable ATSC 3.0 device or the other may have better reception based on where (which side of the house) the portable ATSC 3.0 device is located. The selection of which portable ATSC 3.0 device to use may be based on the measured error rate for the particular channel that is being selected. An error rate measurement is easily performed by digital receivers (e.g., relatively fixed ATSC 3.0 receivers or portable ATSC 3.0 receivers) so there would not be a need for additional hardware in the portable ATSC 3.0 devices. When the TV (relatively fixed ATSC 3.0 receiver) wants to receive a particular channel, the TV (relatively fixed ATSC 3.0 receiver) would send out messages to each of the portable ATSC 3.0 devices indicating the desired channel. The portable ATSC 3.0 devices would measure the error rate for the desired channel and send the error rate measurement back to the TV (relatively fixed ATSC 3.0 receiver). The TV (relatively fixed ATSC 3.0 receivers) would then select the best portable ATSC 3.0 device and start receiving the program from the selected portable ATSC 3.0 device.

If there are multiple TVs (relatively fixed ATSC 3.0 receivers) in a home, there would need to be some coordination among the TVs (relatively fixed ATSC 3.0 receivers) as to which portable ATSC 3.0 device is being used by which TV (relatively fixed ATSC 3.0 receivers). For example if one TV (relatively fixed ATSC 3.0 receiver) is already using a portable ATSC 3.0 device for reception of channel 6, then a second TV (relatively fixed ATSC 3.0 receiver) could not use this portable ATSC 3.0 device for a different channel even if the portable ATSC 3.0 device was the best for the channel that the user of the second TV (relatively fixed ATSC 3.0 receiver) requested (desired). The second TV (relatively fixed ATSC 3.0 receiver) would have to use another portable ATSC 3.0 device. However, there could also be a priority system where a certain TV (relatively fixed ATSC 3.0 receiver) is considered the "Master" TV and could use any portable ATSC 3.0 device the "Master" TV wanted to use regardless of other TV (relatively fixed ATSC 3.0 receiver) usage.

That is, a single TV (relatively fixed ATSC 3.0 receiver) may be in a position to deal with one or more WLAN clients (portable ATSC 3.0 devices) or multiple TVs (relatively fixed ATSC 3.0 receivers) may be in a position of dealing with multiple WLAN clients (portable ATSC 3.0 devices).

FIG. 1 is a schematic overview diagram of the disclosed concept. FIG. 1 shows a single relatively fixed ATSC 3.0 device (receiver) and three portable ATSC 3.0 devices (receivers). The relatively fixed ASTC 3.0 receiver transmits a request to establish communications with one or more of the portable ATSC 3.0 devices (receivers). The request may be unicast to each of the portable ATSC 3.0 devices (receivers) or it may be multicast to a set of all of the portable ATSC 3.0 devices (receivers) where the set of portable ASTC 3.0 devices (receivers) may be the entire set of portable ASTC 3.0 devices in the premises (e.g., home, business, etc.). If the set of portable ATSC 3.0 devices (receivers) is the entire set of portable ATSC 3.0 devices (receivers) then the multicast is equivalent to broadcasting the request. Once communications are established then the relatively fixed ASTC 3.0 device (receiver) may request a signal quality report for a particular channel. The relatively fixed ATSC 3.0 device (receiver) may then select one or more of the portable ATSC 3.0 devices (receivers) from which to receive IP packetized data for a program on the designated channel based on the reported signal quality for the designated channel. The relatively fixed ATSC 3.0 device (receiver) may also determine that the relatively fixed ATSC 3.0 receiver has the best signal quality and the relatively fixed ATSC 3.0 device (receiver) does not need to receive any IP packetized data related to a program on the designated channel to improve signal quality.

It is assumed throughout this description that any of the ATSC 3.0 receivers may be "off" or "inactive". The difference between "off" and "inactive" is that an inactive device is "on" but may be in screen saver mode. A device that is "off" may not be "on" but is still able to receive command and "wake up". It is further assumed that all ATSC 3.0 device (receivers0 are plugged in and/or charged. As used herein measured signal quality is the measured error rate.

If there are multiple relatively fixed ATSC 30.0 receivers in the premises then one of them may be the "master" relatively fixed ATSC 3.0 device (receiver). In this case the "master" relatively fixed ATSC 3.0 device (receiver) has priority in selecting a portable ATSC 3.0 receiver to improve its signal quality. If there is no "master" then any relatively fixed ATSC 3.0 device (receiver) can use any currently unused portable ATSC 3.0 device (receiver) to improve its signal quality. There may also be the instance where there is a "master" relatively fixed ATSC 3.0 device (receiver) but the "master" ATSC 3.0 receiver is not "on" or does not need and is not using any of the portable ATSC 3.0 devices (receivers) to improve its signal quality. In this case there may be a priority order for the remaining relatively fixed ATSC 3.0 devices (receivers) so that there is another relatively fixed ATSC 3.0 device (receiver) would become the "master" relatively fixed ATSC 3.0 device (receiver). If there is not a priority order among the relatively fixed ATSC 30.0 receivers then the scenario in which the "master" ATSC 3.0 receiver is not "on" or does not need and is not using any of the portable ATSC 3.0 devices (receivers) to improve its signal quality becomes the same as if there is no "master" ATSC 3.0 device (receiver).

Figure 2A:
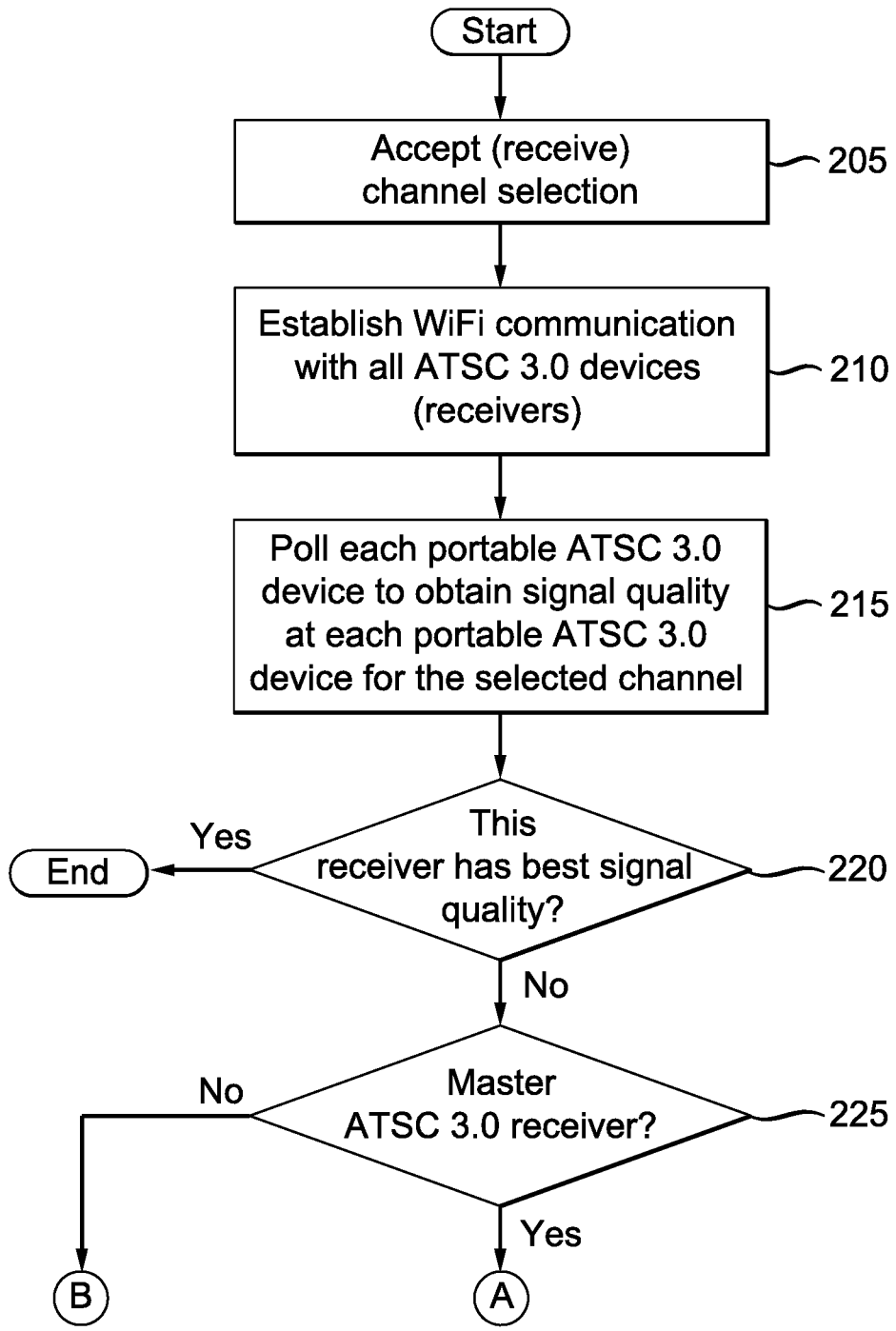
FIGS. 2A and 2B together are a flowchart of the operation of an exemplary relatively fixed ATSC 3.0 device in accordance with the principles of the present invention.
Figure 2B:
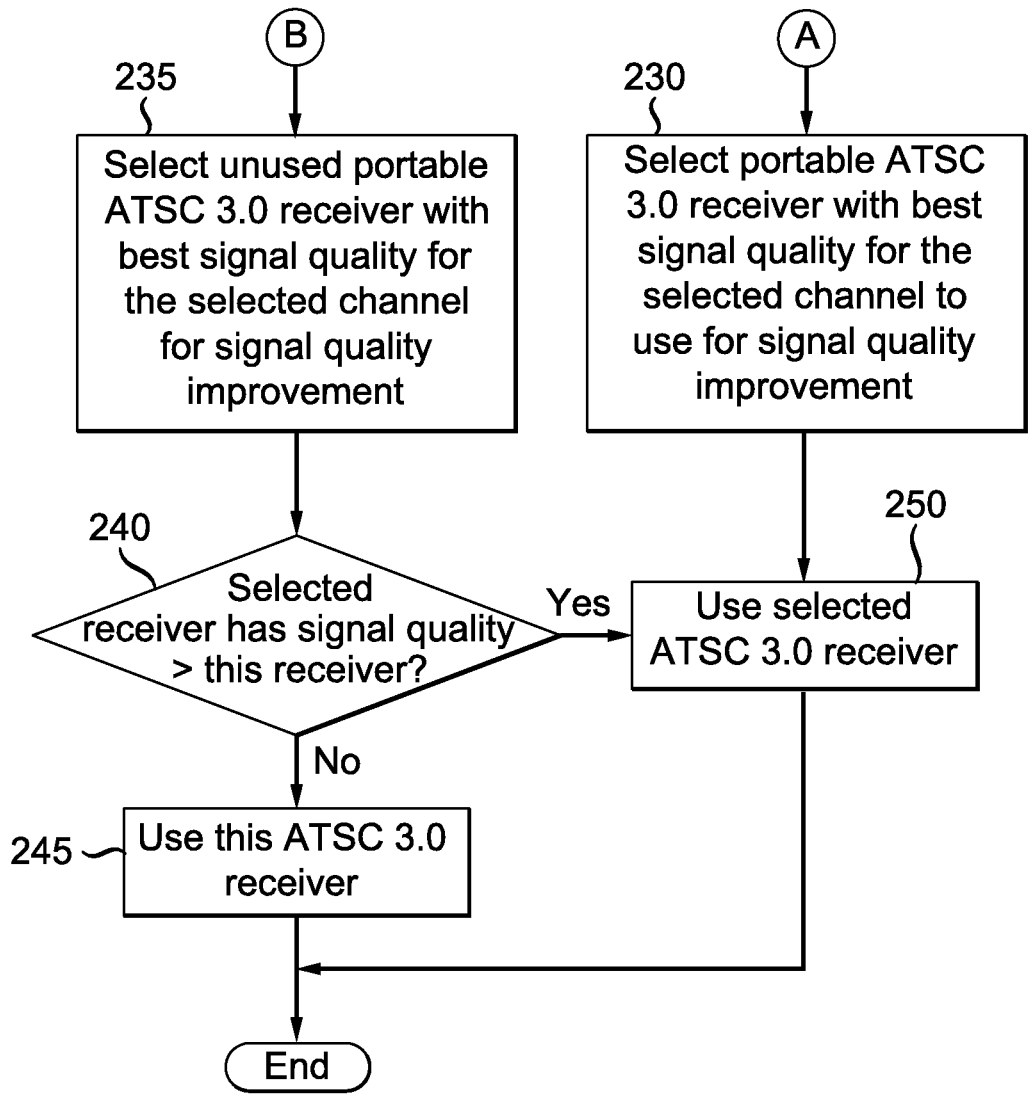

FIGS. 2A and 2B together are a flowchart of the operation of an exemplary relatively fixed ATSC 3.0 device in accordance with the principles of the present invention. At 205 the relatively fixed ATSC 3.0 device (receiver) accepts (receives) a channel selection from a user. At 210 the relatively fixed ATSC 3.0 device (receiver0 transmits a request to establish communications with one or more ATSC 3.0 devices (both relatively fixed and portable). This request may be unicast to each of the devices (receiver) or may be multicast (including broadcast). Communications are established with other relatively fixed ATSC 3.0 devices especially if there is priority among the relatively fixed ASTC 3.0 devices (receivers) and it is necessary to determine which relatively fixed ATSC 3.0 device (receiver) is using which portable ATSC 3.0 device (receiver) for signal quality improvement. At 215 the relatively fixed ATSC 3.0 device (receiver) polls each portable ATSC 3.0 device (receiver), with which it has established communication, to obtain the measured signal quality at each portable ATSC 3.0 device for the selected channel. The received measured signal quality values are or may be stored in a database. At 220 the relatively fixed ATSC 3.0 device (receiver) performs a test to determine if the relatively fixed ATSC 3.0 device (receiver) has the best signal quality from among the received reports of measured signal quality from the portable ATSC 3.0 devices (receivers) and therefore does not need any help (IP packetized data related to a program on the selected channel) from any of the portable ATSC 30.0 devices (receivers) to improve its signal quality. If relatively fixed ATSC 3.0 device (receiver) has the best signal quality from among the received reports of measured signal quality from the portable ATSC 3.0 devices (receivers) and therefore does not need any help (IP packetized data related to a program on the selected channel) from any of the portable ATSC 30.0 devices (receivers) to improve its signal quality then processing ends. If relatively fixed ATSC 3.0 device (receiver) does not have the best signal quality from among the received reports of measured signal quality from the portable ATSC 3.0 devices (receivers) and therefore does need help (IP packetized data related to a program on the selected channel) from any of the portable ATSC 30.0 devices (receivers) to improve its signal quality then at 225 a test is performed to determine if this relatively fixed ATSC 3.0 device (receiver) is the "master" relatively fixed ATSC 3.0 device (receiver). If this relatively fixed ATSC 3.0 device (receiver) is the "master" relatively fixed ATSC 3.0 device (receiver) then at 230 this relatively fixed ATSC 3.0 device (receiver) selects one or more of the portable ATSC 3.0 devices (receivers) from which to receive IP packetized data related to a program on the selected channel to improve its signal quality. Each relatively fixed ATSC 3.0 device maintains a database of relatively fixed ATSC 3.0 devices (receivers) and portable ATSC 3.0 devices (receivers) and which portable ATSC 3.0 devices (receivers) are being used by which relatively fixed ATSC 3.0 devices (receivers). Processing then ends. If this relatively fixed ATSC 3.0 device (receiver) is not the "master" relatively fixed ATSC 3.0 device (receiver) then at 235 this relatively fixed ATSC 3.0 device (receiver) selects one or more unused portable ATSC 3.0 devices (receivers) from which to receive IP packetized data related to a program on the selected channel to improve its signal quality. Each relatively fixed ATSC 3.0 device maintains a database of relatively fixed ATSC 3.0 devices (receivers) and portable ATSC 3.0 devices (receivers) and which portable ATSC 3.0 devices (receivers) are being used by which relatively fixed ATSC 3.0 devices (receivers). At 240 a test is performed to determine if the selected one or more portable ATSC 3.0 devices (receivers) offer better signal quality that this relatively fixed ATSC 3.0 device (receiver). If the one or more selected portable ATSC 3.0 devices (receivers) offer better signal quality then at 250 the selected portable ATSC 3.0 devices (receivers) are used to improve the signal quality of this receiver. It may be determined that no single portable ATSC 3.0 device improves signal quality but all of the unused selected portable ATSC 3.0 devices (receivers) or a subset of all of the selected portable ATSC 3.0 devices (receivers) improve signal quality. The relatively fixed ATSC 3.0 device (receiver) combines the received IP packetized data received from the one or more selected portable ATSC 3.0 devices (receivers) with any broadcasts to improve the signal quality offered to the user of the relatively fixed ATSC 3.0 device (receiver). If the one or more selected portable ATSC 3.0 devices (receivers) do not offer better signal quality then at 245 use this relatively fixed ATSC 3.0 device (receiver). The signal received from said portable ATSC 3.0 devices (receivers) is in the form of IP packetized data for a program on the selected channel. If one or more portable ATSC 3.0 devices (receivers) are used to receive signal(s), the IP packetized data is combined with the signal received by the relatively fixed ATSC 3.0 device (TV) to form a combined signal for rendering.

Figure 3A:
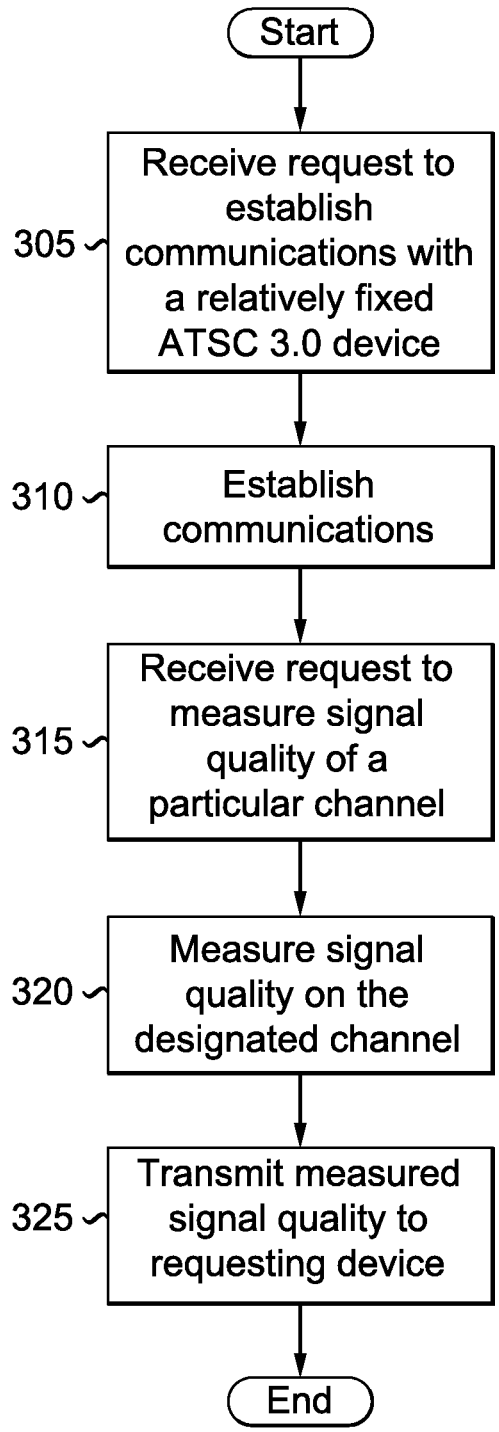
FIG. 3A is a flowchart of the operation of an exemplary portable ATSC 3.0 device in accordance with the principles of the present invention.

FIG. 3A is a flowchart of the operation of an exemplary portable ATSC 3.0 device in accordance with the principles of the present invention. At 305 the portable ATSC 3.0 device (receiver) receives a request to establish communications with a relatively fixed ATSC 3.0 device (receiver). At 310 the portable ATSC 3.0 device (receiver) establishes communications with the relatively fixed ATSC 3.0 device (receiver) that requested establishing communications. At 315 the portable ATSC 3.0 device (receiver) receives a request to measure the signal quality (error rate) of a particular channel (the channel having been selected by the relatively fixed ATSC 3.0 device (receiver)). At 320 the portable ATSC 3.0 device (receiver) measure the signal quality on the selected channel. At 325 the portable ATSC 3.0 device (receiver) transmits the measured signal quality to the relatively fixed ATSC 3.0 device (receiver) that requested the signal quality measurement.

Figure 3B:
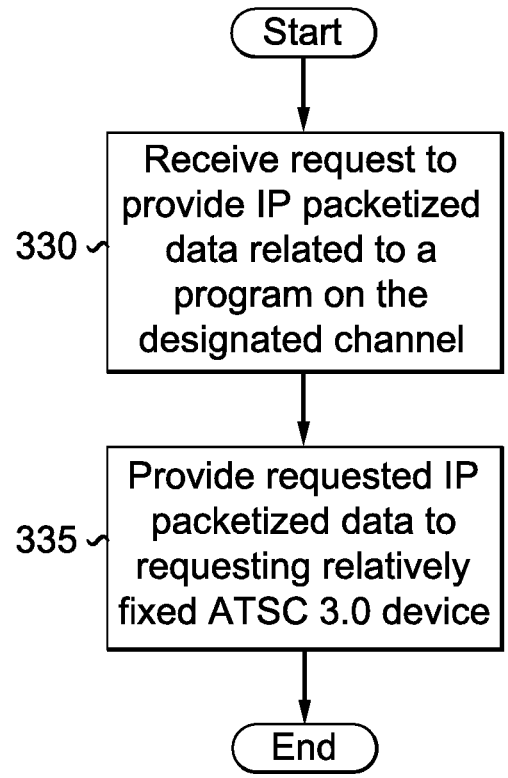
FIG. 3B is a flowchart of the operation of an exemplary portable ATSC 3.0 device which has been selected to provide IP packetized data to a relatively fixed ATSC 3.0 device based on a signal quality measurement.

FIG. 3B is a flowchart of the operation of an exemplary portable ATSC 3.0 device which has been selected to provide IP packetized data to a relatively fixed ATSC 3.0 device based on a signal quality measurement. At 330 the portable ATSC 3.0 device that has been selected receives a request to provide IP packetized data related to a program on the selected (designated) channel. At 335 the portable ATSC 3.0 device (receiver) provides (transmits, sends, forwards) the IP packetized data related to a program on the selected (designated) channel.

Figure 4:
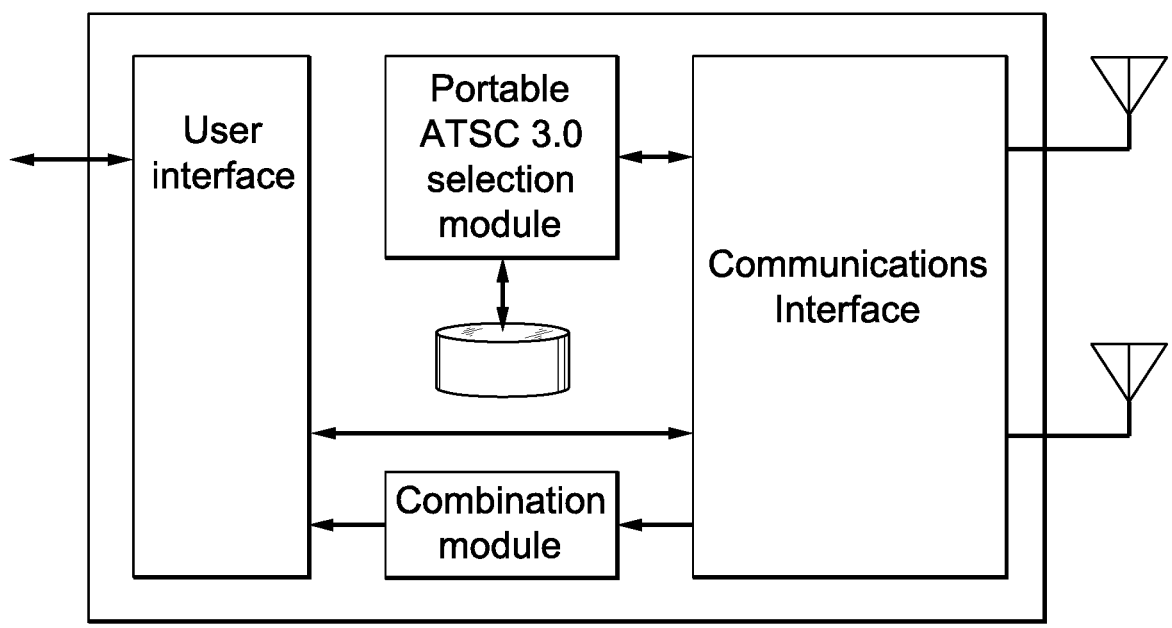
FIG. 4 is a block diagram of an exemplary relatively fixed ATSC 3.0 device in accordance with the principles of the present invention.

FIG. 4 is a block diagram of an exemplary relatively fixed ATSC 3.0 device in accordance with the principles of the present invention. The relatively fixed ATSC 3.0 device of FIG. 4 has a user interface to receive the channel selection information. The relatively fixed ATSC 3.0 device of FIG. 4 also has a communications interface, which has at least one and may have several antennas. One antenna may be for WiFi communications and one antenna may be for broadcast reception. Additional antennas may be present. It is not uncommon to use multiple antennas for spatial diversity. The communications interface establishes WiFi communications with other relatively fixed ATSC 3.0 devices (receivers) as well as with portable ATSC 3.0 devices (receivers). The communications interface also polls the portable ATSC 3.0 devices (receivers) to obtain signal quality (error rate) at each portable ATSC 3.0 device (receiver) for the selected channel. The relatively fixed ATSC 3.0 device (receiver) also includes a portable ASTC 3.0 selection module, which receives the signal quality information from the communications interface and may store the received signal quality information in a database. The portable ATSC 3.0 selection module determines which one or more portable ATSC 3.0 devices (receivers) to use to improve the signal quality of the relatively fixed ATSC 3.0 device (receiver). This determination is base not only on the measured signal quality (error rate) information received from the portable ATSC 3.0 devices (receivers) but also on their availability and the status of the relatively fixed ATSC 3.0 device (receiver). The status includes whether or not the relatively fixed ATSC 3.0 device (receiver) is the "master" TV and if any of the one or more selected the portable ATSC 3.0 devices (receivers) are already in use by other relatively fixed ATSC 3.0 devices (receivers). If any of the one or more selected portable ATSC 3.0 devices (receivers) are available then the IP packetized data related to a program on the selected channel is received by the communications interface from the one or more portable ATSC 3.0 devices (receivers) and forwarded to the combination module. The combination module the received IP packetized data related to a program on the selected channel from the one or more portable ATSC 3.0 devices (receivers) with the broadcast content to improve the signal quality. The combination of the broadcast content and the IP packetized data related to a program on the selected channel may be accomplished by integration, interleaving, splicing etc. the combined signal (broadcast and IP packetized data) is then provided to the display portion of the relatively fixed ATSC 3.0 device (receiver). The display portion of the relatively fixed ATSC 3.0 device (receiver) is accessed by the user interface. The user interface is in bi-directional communication with the user through the display and the remote control device of the relatively fixed ATSC 3.0 device (receiver). The communications interface is in bi-directional communication with the portable ATSC 3.0 selection module, which is in bi-directional communication with the storage (memory) module. The user interface is also in bi-directional communication with the communications interface. The communications module is in communication with the combination module, which is in communication with the user interface.

The portable ATSC 3.0 devices (receivers) include at least a communications interface which may use one or more antennas. One antenna may be for WiFi communications and one antenna may be for broadcast reception. Additional antennas may be present. It is not uncommon to use multiple antennas for spatial diversity. The communications interface receives requests to establish communication with one or more relatively fixed ATSC 3.0 devices (receivers) and establishes communications as requested. The communications interface also receives requests to measure the signal quality (error rate) of selected channels and measures the signal quality as requested. The communications interface also transmits the measured signal quality to the requesting relatively fixed ATSC 3.0 device (receiver). The communications interface also receives requests to provide (send, transmit, forward) IP packetized data that it receives for a program on the selected channel to the relatively fixed ATSC 3.0 device (receiver) and the communication interface transmits (forwards, sends, provides) the requested IP packetized data that it receives to the requesting relatively fixed ATSC 3.0 device (receiver). The communications interface may also be in bi-directional communication with storage (memory) and use the storage (memory) to temporarily store data.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
accepting, at a receiving device, a channel selection from a user;
transmitting, from said receiving device, a request to establish communications with a mobile device;
establishing communications with said mobile device;
transmitting, from said receiving device, a request to said mobile device for signal quality information, said signal quality information associated with said selected channel;
receiving first program data at said receiving device on said selected channel;
receiving second program data at said receiving device from said mobile device, said second program data including data related to first program data received on said selected channel; and
combining said second program data received from said mobile device with said first program data received by said receiving device on said selected channel to form a combined signal for rendering a program on said receiving device;
wherein said second program data received from said mobile device is determined based on said channel selection.

2. The method according to claim 1, further comprising:
maintaining a database, the database comprising a list of all mobile devices in a premises and an indication, for each mobile device, whether said mobile devices are unused;
establishing communications with all mobile devices in said premises;
polling each mobile device in said premises to obtain signal quality information for said selected channel; and
selecting, based on said indication whether said mobile devices are unused, at least one of said mobile devices from which to receive said second program data.

3. The method according to claim 2, wherein said receiving device is a TV.

4. The method according to claim 2, wherein said mobile device is one of a cell phone or a tablet.

5. The method according to claim 2, wherein said communications are established over a WiFi communications channel.

6. The method according to claim 2, further comprising:
first determining if the receiving device has better signal quality, based on said signal quality information, than said mobile devices;
receiving said first program data from said receiving device responsive to said first determination;
second determining if said receiving device is a master device responsive to said first determination;
selecting at least one mobile device to receive second program data responsive to said second determination;
requesting said second program data;
receiving said second program data from said at least one selected mobile device to improve said signal quality at said receiving device;
combining said first program data from said receiving device with said second program data received from said at least one selected mobile device to form a combined signal for rendering on said receiving device;
further selecting a mobile device to receive said second program data;
third determining if said further selected mobile device has better signal quality than said receiving device;
responsive to said third determination, requesting said second program data from said further selected mobile device to improve said signal quality at said receiving device responsive to said third determination;
receiving said second program data; and
combining said second program data received from said further selected mobile device with said first program data received from said receiving device to form a combined signal for rendering on said receiving device.

7. A receiving device, comprising:
a user interface, said user interface configured to accept a channel selection at said receiving device;
a communications interface, said communications interface configured to: transmit a request to establish communications with a mobile device, establish communications with said mobile device, transmit a request to said mobile device for signal quality information, receive first program data on said selected channel, and receive second program data at said receiving device from said mobile device, wherein said second program data includes data related to said first program data received on said selected channel, and wherein said signal quality information is associated with said selected channel; and a combination module, said combination module configured to combine said second program data received from said mobile device with said first program data received by said receiving device on said selected channel to form a combined signal for rendering a program on said receiving device, wherein said second program data received from said mobile device is determined based on said channel selection.

8. The receiving device of claim 7, wherein:

said receiving device maintains a database comprising a list of all mobile devices in a premises and an indication, for each mobile device, whether said mobile devices are unused;

said communications interface establishes communications with all mobile devices in said database, said communications interface in bi-directional communications with said user interface;

wherein said communications interface polls each mobile device in said premises to obtain signal quality information for said selected channel; and wherein a mobile device selection module selects, based on said indication whether said mobile devices are unused, at least one of said mobile devices from which to receive said second program data.

9. The receiving device according to claim 8, wherein said receiving device is a TV.

10. The receiving device according to claim 8, wherein said mobile device is one of a cell phone or a tablet.

11. The receiving device according to claim 8, wherein said communications are established over a WiFi communications channel.

12. The receiving device according to claim 8, further comprising:

said communications interface first determining if the receiving device has better signal quality, based on said signal quality information, than said mobile devices;

said communications interface receiving said first program data from said receiving device responsive to said first determination;

said mobile device selection module second determining if said receiving device is a master device responsive to said first determination;

said mobile device selection module selecting at least one mobile device to receive said second program data responsive to said second determination;

said mobile device selection module requesting said second program data;

said communications interface, receiving said second program data from said at least one selected mobile device to improve said signal quality at said receiving device;

a combination module, said combination module combining said first program data from said receiving device with said second program data received from said at least one selected mobile device to form a combined signal for rendering on said receiving device;

said mobile device selection module further selecting a mobile device to receive said second program data;

said mobile device selection module third determining if said further selected mobile device has better signal quality than said receiving device;

said communications interface requesting said second program data from said further selected mobile device to improve said signal quality at said receiving device responsive to said third determination;

said communications interface receiving said second program data; and said combination module combining said second program data received from said further selected mobile device with said first program data received from said receiving device to form a combined signal for rendering on said receiving device.

* * * * *